Figure 1:
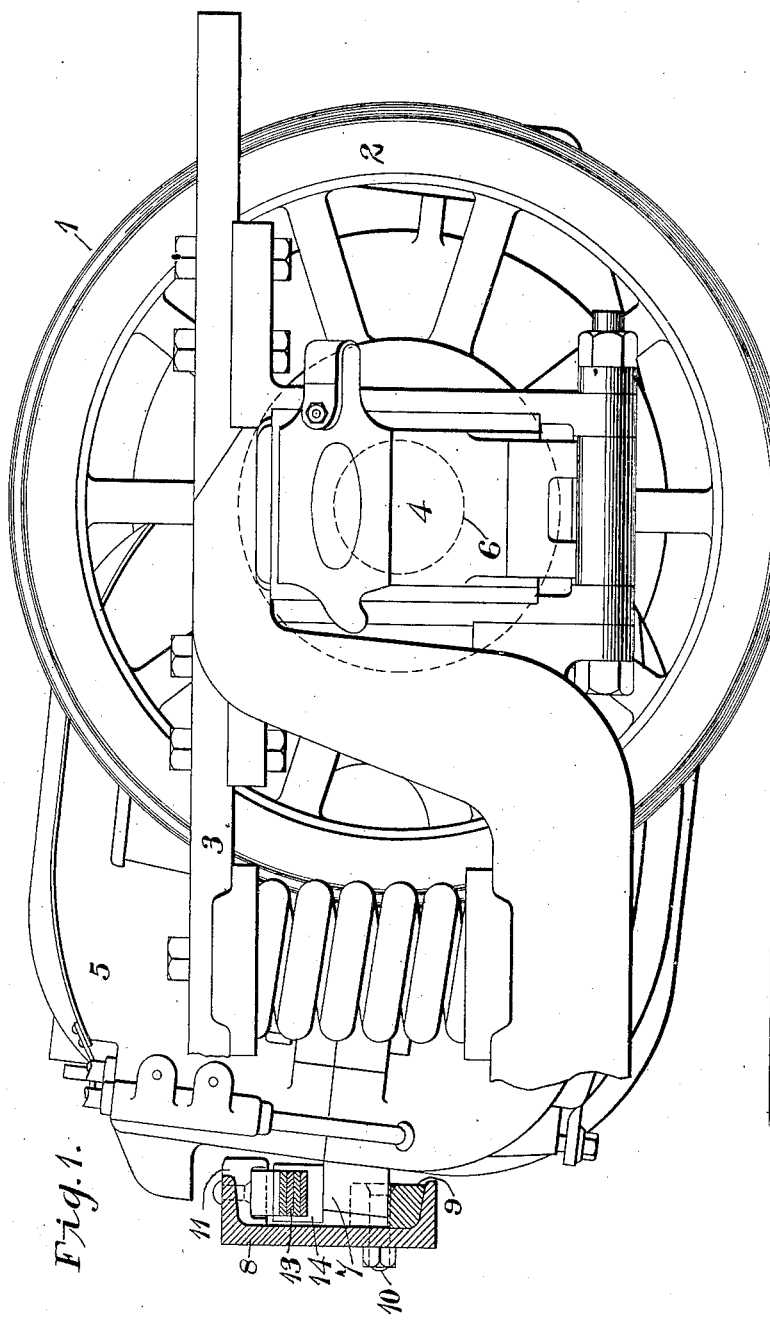

No. 829,557. PATENTED AUG. 28, 1906.
J. E. WEBSTER.
MOTOR SUSPENSION.
APPLICATION FILED JAN. 3, 1906.

WITNESSES:
Fred. H. Miller
R. J. Dearborn

INVENTOR
John E. Webster
BY
Wesley G. Carr
ATTORNEY

UNITED STATES PATENT OFFICE.

JOHN E. WEBSTER, OF PITTSBURG, PENNSYLVANIA, ASSIGNOR TO WESTINGHOUSE ELECTRIC & MANUFACTURING COMPANY, A CORPORATION OF PENNSYLVANIA.

MOTOR SUSPENSION.

No. 829,557.     Specification of Letters Patent.     Patented Aug. 28, 1906.

Application filed January 3, 1906. Serial No. 294,418.

*To all whom it may concern:*

Be it known that I, JOHN E. WEBSTER, a citizen of the United States, and a resident of Pittsburg, in the county of Allegheny and State of Pennsylvania, have invented a new and useful Improvement in Motor Suspension, of which the following is a specification.

My invention relates to the suspension of driving-motors upon the trucks of railway-cars or other vehicles; and it has for its object to provide adequate means for preventing a vibratory motion between the portions of the driving-motors which are rigidly attached to or rest upon the truck-frame and the portions of the truck engaged thereby that shall be simple and durable in construction and which may be readily applied to well-known forms of motor suspension.

There are several well-known methods for suspending electric vehicle-motors from their trucks, among which is the so-called "nose suspension." According to this method the motor-frame, which constitutes an inclosing casing, is pivotally mounted upon one axle of the truck and is provided with a nose or projection or a plurality of such parts at its opposite side to rest upon one or more ledges or shelves with which a cross-beam of the truck-frame is provided, and since the truck-frame is mounted upon springs a flexible suspension is in this way provided for the motor.

In fastening the motor projections to the portion of the truck-frame upon which they rest provision must be made for a certain amount of lost motion, since the truck-frame may move in substantially vertical lines independently of the axles, while such motion produces a rotative motion of the motors about the center lines of the axles upon which they are mounted. When the vehicle is in operation, the truck-frames are constantly vibrating as the vehicle-wheels pass over irregularities in the road or joints in the track, and as heretofore mounted the projections on the motor continually chattered and hammered against the cross-beams upon which they rested.

Vehicle-motors in general are relatively heavy, so that the hammering just referred to tends to injure the truck-frame and to so wear away the motor projections as to permit an increased chatter, which constitutes a source of discomfort or positive annoyance to passengers. In order to obviate these undesirable features, I apply a spring in such a way as to exert a downward pressure upon the projection of the motor-frame and by this means to so absorb the vibrations that the motor projections are kept constantly in engagement with the truck-frame.

My invention is illustrated in the accompanying drawings, in which—

Figure 2:
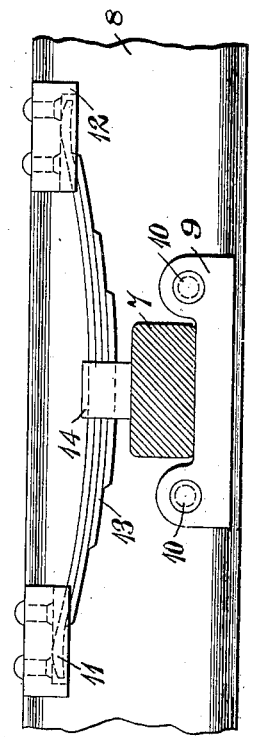

Figure 1 is a view, mainly in elevation, but partially in section, of a railway-vehicle truck which is equipped with electric motors suspended in accordance with my invention; and Fig. 2 is a detail view in which the spring-support of my invention is more fully disclosed.

Referring to the drawings, a railway-vehicle truck 1 comprises suitable axles to which wheels 2 are rigidly attached, and a truck-frame 3, which is flexibly mounted upon a plurality of bearings 4, that engage the axles. An electric motor 5 is pivotally mounted upon one of the axles 6, and the inner end of its frame, which extends toward the center of the truck, is provided with a projection 7, which rests upon a cross-beam 8 of the truck-frame. The cross-beam 8 is of channel form and is provided with a block 9, which is attached thereto by bolts 10 and forms a ledge or shelf upon which the projection 7 may rest. A plurality of blocks 11 and 12 are also attached to the channel-beam 8 near its upper edge and are slotted to receive the extremities of a spring 13, which is interposed between the upper edge of the channel and the projection 7 on the motor-frame. The center of the spring is provided with a collar 14, which keeps the several spring members together and which rests upon the top of the motor projection 7.

Although I have illustrated and described the spring-support of my invention as applied only to a specific vehicle-motor and truck, its application is of course not restricted to such use, and various types of springs may be employed within its scope in connection with driving-motors of any suitable form having one or more supporting projections.

It will be understood also that such design and arrangement of parts as may reverse the direction in which the spring acts will not serve to remove the structure from the scope of my invention and the claims covering the same.

I claim as my invention—

1. The combination with a vehicle-truck, an electric motor pivotally mounted upon an axle of the truck and a projection on the motor-frame which rests upon the truck-frame, of means for exerting a constant downward pressure upon said projection.

2. The combination with a vehicle-truck, an electric motor pivotally mounted upon an axle of the truck and a projection on the motor-frame which rests upon the truck-frame, of a spring which exerts a downward pressure upon the projection.

3. The combination with a vehicle-truck, an electric motor pivotally mounted upon an axle of the truck and a projection on the motor-frame which rests upon the truck-frame, of a spring which is interposed between an overhanging ledge on the truck-frame and the projection.

4. The combination with a vehicle-truck, an electric driving-motor therefor which is pivotally mounted on the truck-axle and a projection on the motor-frame which rests upon a cross-beam of the truck, of means for holding the projection in engagement with the cross-beam.

5. The combination with a vehicle-truck, an electric driving-motor therefor which is pivotally mounted on the truck-axle and a projection on the motor-frame which rests upon a cross-beam of the truck, of means for holding the projection in engagement with the cross-beam that comprises a spring which is interposed between an overhanging ledge on the beam and the projection.

6. The combination with a vehicle-truck, of an electric motor having a field-magnet frame which constitutes an inclosing casing and is pivotally mounted upon one of the truck-axles and a nose or projection which rests upon the truck-frame, and resilient means for holding the projection in engagement with the truck-frame.

7. The combination with a vehicle-truck and an electric motor having a field-magnet frame which constitutes an inclosing casing and is pivotally mounted upon one of the truck-axles and a nose or projection which rests upon the truck-frame, of a spring which exerts a downward pressure upon said nose or projection.

8. The combination with a vehicle-truck and an electric motor having a field-magnet frame which is pivotally mounted upon one of the truck-axles and has a nose or projection which engages a member of the truck-frame, of a spring interposed between one side of the nose or projection and the adjacent side of the truck-frame member.

9. The combination with a vehicle-truck, an electric motor pivotally mounted upon a truck-axle and having a projection that engages a member of the truck-frame, of a resilient means for maintaining a constant but movable engagement between one side of the projection and the adjacent side of the truck-frame member.

In testimony whereof I have hereunto subscribed my name this 28th day of December, 1905.

JOHN E. WEBSTER.

Witnesses:
M. MacLaren,
Birney Hines.